United States Patent
Lin (10) Patent No.: US 10,979,925 B2
(45) Date of Patent: Apr. 13, 2021

(54) MEASUREMENT TIMING CONFIGURATION FOR CSI-RS

(71) Applicant: MEDIATEK INC., Hsinchu (TW)

(72) Inventor: Hsuan-Li Lin, Hsinchu (TW)

(73) Assignee: MediaTek INC., Hsin-Chu (TW)

( * ) Notice: Subject to any disclaimer, the term of this patent is extended or adjusted under 35 U.S.C. 154(b) by 83 days.

(21) Appl. No.: 16/264,679

(22) Filed: Feb. 1, 2019

(65) Prior Publication Data

US 2019/0253906 A1   Aug. 15, 2019

Related U.S. Application Data

(60) Provisional application No. 62/629,907, filed on Feb. 13, 2018.

(51) Int. Cl.
*H04W 24/10* (2009.01)

(52) U.S. Cl.
CPC ................... *H04W 24/10* (2013.01)

(58) Field of Classification Search
CPC . H04W 24/10; H04W 72/08; H04W 56/0005; H04W 72/085; H04W 16/28; H04W 72/04; H04W 72/046; H04W 72/0453; H04W 88/02; H04W 48/16; H04W 88/08; H04B 7/06; H04B 7/0626; H04B 7/0456; H04B 7/0628; H04B 7/088; H04L 5/0057; H04L 5/0048; H04L 5/0023; H04L 5/0094; H04L 1/0026; H04L 5/0051; H04L 5/005; H04L 5/0007; H04L 12/26; H04L 7/0008; H04L 5/001; H04L 43/0876; H04L 5/0053
See application file for complete search history.

(56) References Cited

U.S. PATENT DOCUMENTS

| 2019/0053235 A1* | 2/2019 | Novlan | H04L 5/001 |
| 2019/0312668 A1* | 10/2019 | Park | H04L 5/00 |
| 2020/0053738 A1* | 2/2020 | Harada | H04L 5/0048 |

OTHER PUBLICATIONS

International Search Report and Written Opinion of International Search Authority for PCT/CN2019/074582 dated Apr. 28, 2019 (8 pages).
R1-1716798 3GPP TSG RAN WG1 Meeting #NR-AH3, NTT DOCOMO, "offline summary on remaining details on RRM measurements", Nagoya, Japan dated Sep. 18-21, 2017 (15 pages) *pp. 3-7, 12*.

(Continued)

*Primary Examiner* — Hardikkumar D Patel
(74) *Attorney, Agent, or Firm* — Imperium Patent Works; Zheng Jin (57) ABSTRACT

A method of CSI-RS Measurement Timing Configuration (CMTC) is proposed. The CMTC timing window is specifically configured to UE for CSI-RS RRM/mobility measurement via Radio Resource Control (RRC) signaling. CMTC can be carrier-specific or measurement object (MO) specific configured. Multiple CMTC can be configured to a UE, in a carrier-specific or a measurement object (MO) specific fashion. For inter frequency measurement, one CMTC on a carrier can be configured. For intra frequency measurement, up to two CMTC on a carrier can be configured. The CSI-RS resources associated to a given cell shall be configured within one slot. The CSI-RS resources on a carrier can be configured in the carrier specific CMTC. A gap shall be configured to include the CMTC for inter-frequency measurement.

10 Claims, 5 Drawing Sheets

SMTC, CMTC, and MEASUREMENT GAP CONFIGURATION (56) References Cited

OTHER PUBLICATIONS

R1-1721587 3GPP TSG RAN WG1#91, Samsung, "Summary of remaining issue on NR RRM", Reno, USA dated Nov. 27-Dec. 1, 2017 (33 pages).
R1-1715915 3GPP TSG RAN WG1 Meeting NR#3, Samsung, "Remaining issues on the NR mobility", Nagoya, Japan dated Sep. 18-21, 2017 (13 pages).
R4-1800662 3GPP TSG-RAN WG4 Meeting AH 1801, Huawei et al., "Discussion on CSI-RS Measurement Period", San Diego, USA dated Jan. 22-26, 2017 (5 pages).

* cited by examiner

FIG. 9

MEASUREMENT TIMING CONFIGURATION FOR CSI-RS

CROSS REFERENCE TO RELATED APPLICATIONS

This application claims priority under 35 U.S.C. § 119 U.S. provisional application 62/629,907 entitled "Measurement Timing Configuration for CSI-RS" filed on Feb. 13, 2018, the subject matter of which is incorporated herein by reference.

TECHNICAL FIELD

The disclosed embodiments relate generally to wireless communication, and, more particularly, to method and apparatus for Channel State Information Reference Signal (CSI-RS) measurement timing configuration in New Radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

Reference Signal Received Power (RSRP) and Reference Signal Received Quality (RSRQ) are key measurements of signal level and quality for LTE and NR networks. In cellular networks, when UE moves from cell to cell and performs cell selection, reselection and handover, UE needs to measure the signal strength and quality of the neighbor cells. Received Strength Signal Indicator (RSSI) measurements can be used to determine RSRP and RSRQ. RSSI measures the average total received power observed in OFDM symbols containing reference symbols in the measurement bandwidth over certain resource blocks. RSSI is measured over the entire bandwidth including noise, serving cell power and interference power.

In addition to RSSI/RSRP/RSRQ measurements, UE can be configured to measure synchronization signal (SS) blocks (SSB) and/or channel state information (CSI) reference signal (CSI-RS). In LTE, DMTC (DRS measurement timing configuration) was provided for DRS (Discovery reference signal), which includes PSS/SSS/CRS/CSI-RS. LTE CSI-RS used as DRS was piggy-backed to CRS resources, and no delicate measurement window for CSI-RS resources. In NR, SMTC (SSB measurement timing configuration) is provided for SSB RRM (Radio Resource Management), which avoids UE to keep searching SSB for a long time, especially for inter-frequency measurement.

However, currently NR lacks the concept of measurement window for NR CSI-RS RRM, and the CSI-RS resources for mobility are configured at per resources basis. This potentially complicates UE's implementation and increases UE power consumption. For example, CSI-RS resources could be configured spreading out in time domain, and UE would be mandated to keep monitoring. It is thus an objective of the current invention to reduce UE power consumption for CSI-RS RRM by confining CSI-RS for RRM measurement within the CSI-RS measurement timing configuration (CMTC) timing window.

SUMMARY

A method of CSI-RS Measurement Timing Configuration (CMTC) is proposed. The CMTC timing window is specifically configured to UE for CSI-RS RRM/mobility measurement via Radio Resource Control (RRC) signaling. CMTC can be carrier-specific or measurement object (MO) specific configured. Multiple CMTC can be configured to a UE, in a carrier-specific or a measurement object (MO) specific fashion. For inter frequency measurement, one CMTC on a carrier can be configured. For intra frequency measurement, up to two CMTC on a carrier can be configured. The CSI-RS resources associated to a given cell shall be configured within one slot. The CSI-RS resources on a carrier can be configured in the carrier specific CMTC. A gap shall be configured to include the CMTC for inter-frequency measurement.

In one embodiment, a UE receives a channel state information reference signal (CSI-RS) measurement timing configuration (CMTC) from a network. The CMTC comprises a CMTC timing offset, a CMTC duration, and a CMTC periodicity to indicate CMTC timing windows. The UE receives a synchronization signal block (SSB) measurement timing configuration (SMTC) to indicate SMTC timing windows from the network. The UE determines time locations of CSI-RS radio resources for CSI-RS measurement based on the CMTC timing windows, the SMTC timing windows, and also based on a measurement gap configuration when an inter-frequency CSI-RS or SSB measurement is configured. The UE performs CSI-RS measurements using the derived time locations of the CSI-RS resources.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
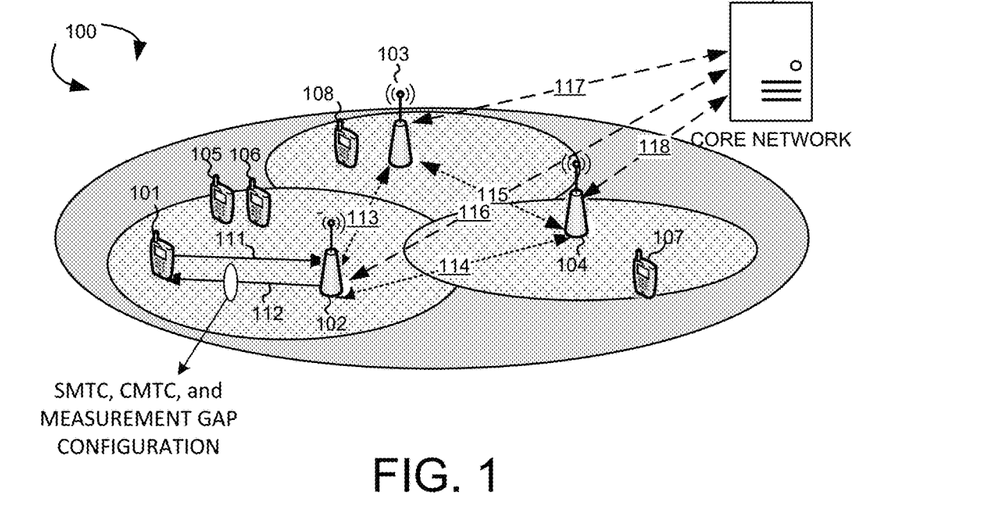
FIG. 1 illustrates a system diagram of a new radio (NR) mobile communication system with Channel State Information Reference Signal (CSI-RS) measurement timing configuration (CMTC) in accordance with embodiments of the current invention.

FIG. 1 illustrates a system diagram of a new radio (NR) mobile communication system 100 with Channel State Information Reference Signal (CSI-RS) measurement timing configuration (CMTC) in accordance with embodiments of the current invention. Wireless cellular communication system 100 comprises one or more wireless networks having fixed base infrastructure units, such as receiving wireless communications devices or base units 102 103, and 104, forming wireless radio access networks (RANs) distributed over a geographical region. The base units may also be referred to as an access point (AP), an access terminal, a base station (BS), a Node-B, an eNodeB, an eNB, a gNodeB, a gNB, or by other terminology used in the art. Each of the base unit 102, 103, and 104 serves a geographic area and connects to a core network 109 e.g., via links 116, 117, and 118 respectively. The base unit performs beamforming in the NR system, e.g., utilizing Millimeter Wave frequency spectrum. Backhaul connections 113, 114 and 115 connect the non-co-located receiving base units, such as gNB 102, gNB 103, and gNB 104. The backhaul connections can be ideal or non-ideal.

A user equipment UE 101 in wireless system 100 is served by base station 102 via uplink 111 and downlink 112. Other UEs 105, 106, 107, and 108 are served by different base stations. UEs 105 and 106 are served by base station 102. UE 107 is served by base station 104. UE 108 is served by base station 103. Each UE may be a smart phone, a wearable device, an Internet of Things (IoT) device, a tablet, etc. In OFDMA systems, the radio resource is partitioned into radio frames and subframes, each of which is comprised of time slots and OFDMA symbols along time domain. Each OFDMA symbol further consists of a number of OFDMA subcarriers along frequency domain depending on the system bandwidth. The basic unit of the resource grid is called Resource Element (RE), which spans a subcarrier over one OFDMA symbol. A resource block occupies one slot and twelve subcarriers.

In NR systems, UE can be configured to measure synchronization signal (SS) blocks (SSB) and/or channel state information (CSI) reference signal (CSI-RS). In LTE, DMTC (DRS measurement timing configuration) was provided for DRS (Discovery reference signal), which includes PSS/SSS/CRS/CSI-RS. LTE CSI-RS used as DRS was piggy-backed to CRS resources, and no delicate measurement window for CSI-RS resources. In NR, SMTC (SSB measurement timing configuration) is provided for SSB RRM (Radio Resource Management), which avoids UE to keep searching SSB for a long time, especially for inter-frequency measurement. However, currently NR lacks the concept of measurement window for NR CSI-RS RRM, and the CSI-RS resources for mobility are configured at per resources basis. This potentially complicates UE's implementation and increases UE power consumption. For example, CSI-RS resources could be configured spreading out in time domain, and UE would be mandated to keep monitoring.

In accordance with one novel aspect, CSI-RS Measurement Timing Configuration (CMTC) measurement window is specifically configured to UE for CSI-RS RRM/mobility measurement via Radio Resource Control (RRC) signaling. CMTC can be carrier-specific or measurement object (MO) specific configured. Multiple CMTC can be configured to a UE, in a carrier-specific or a measurement object (MO) specific fashion. For inter frequency measurement, one CMTC on a carrier can be configured. For intra frequency measurement, up to two CMTC on a carrier can be configured. The CSI-RS resources associated to a given cell shall be configured within one slot. The CSI-RS resources on a carrier can be configured in the carrier specific CMTC. A gap shall be configured to include the CMTC, for interfrequency measurement. CMTC could be also called as CSI-RS burst, which includes the CSI-RS resources form one or multiple cells in a carrier.

Figure 2:
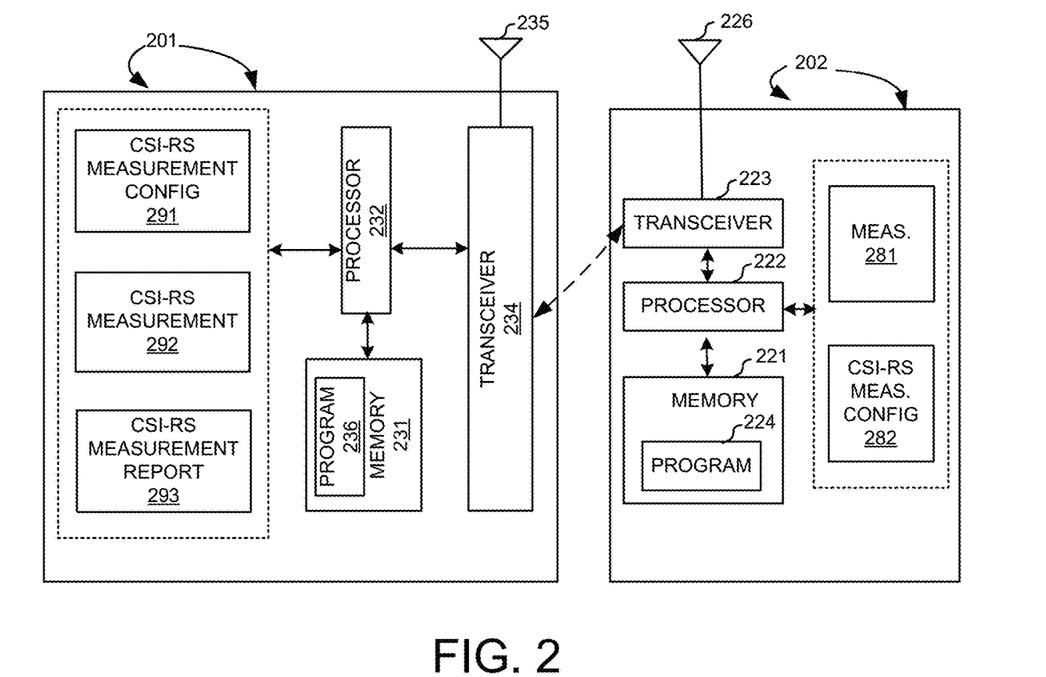
FIG. 2 shows simplified block diagrams of a UE and a BS in accordance with embodiments of the current invention.

FIG. 2 shows simplified block diagrams of a wireless devices, e.g., UE 201 and base station 202 in accordance with the current invention. Base station 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in base station 202. Memory 221 stores program instructions and data 224 to control the operations of base station 202. Base station 202 also includes a set of control modules and circuits, such as a measurement circuit 281 that performs measurements and an RSSI measurement configuration circuit 282 that configures CSI-RS measurements for UEs.

Similarly, UE 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in mobile station 201. Memory 231 stores program instructions and data 236 to control the operations of mobile station 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines.

UE 201 also includes a set of control modules and circuits that carry out functional tasks. These functions can be implemented in software, firmware and hardware. A processor in associated with software may be used to implement and configure the functional features of UE 201. For example, a CSI-RS measurement configuration circuit 291 configures an CSI-RS measurement radio resources from the network. The CSI-RS measurement configuration includes CMTC timing windows of timing offset, duration, and periodicity. An CSI-RS measurement circuit 292 performs an CSI-RS measurement based on the CSI-RS measurement configuration. A CSI-RS measurement report circuit 293 transmits CSI-RS measurement report to the NR network for radio resource management.

Figure 3:
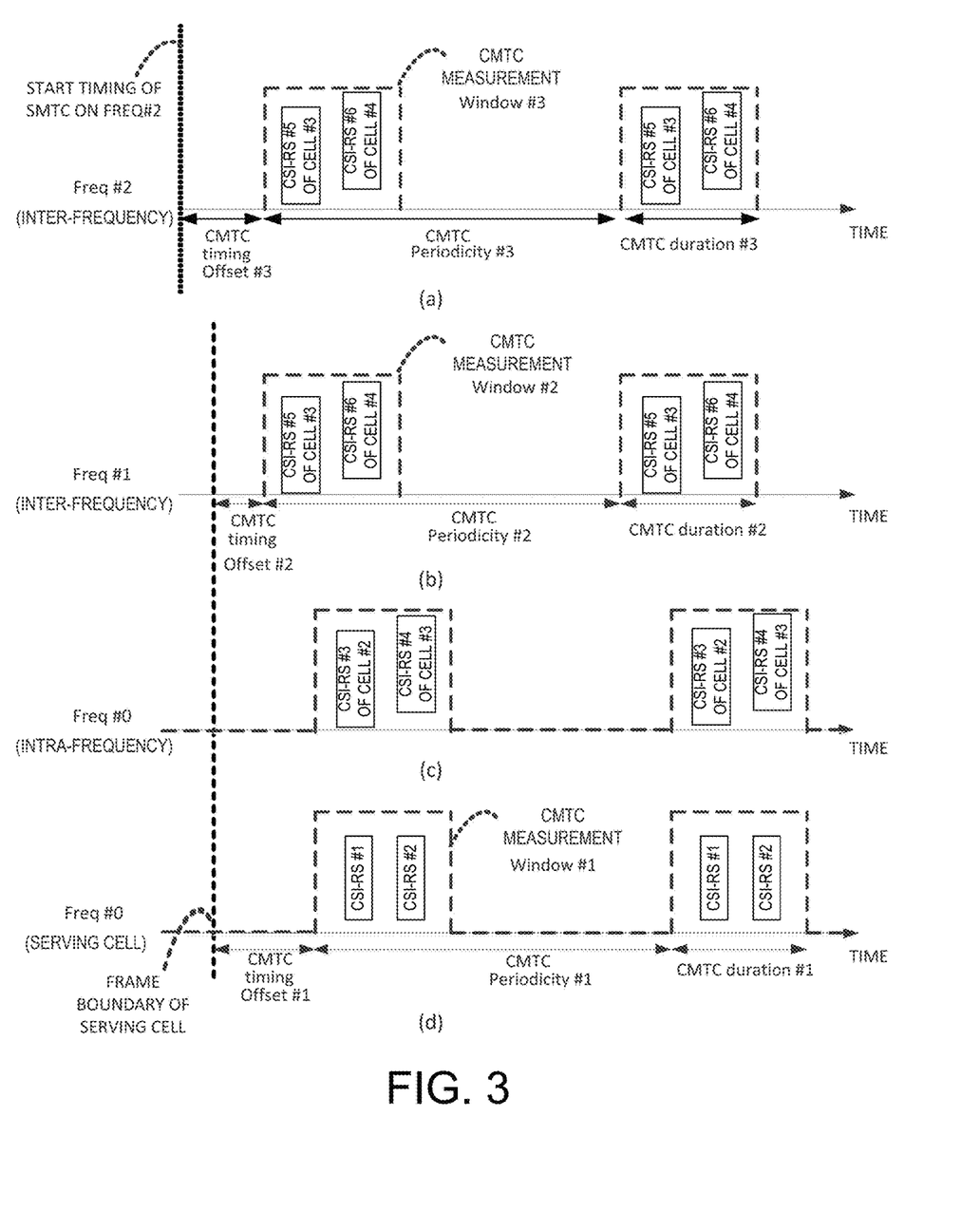
FIG. 3 illustrates embodiments of CMTC parameters comprising timing offset, duration, and periodicity for intra-frequency and inter-frequency CSI-RS measurement in accordance with one novel aspect.

FIG. 3 illustrates embodiments of CMTC parameters comprising timing offset, duration, and periodicity for intra-frequency and inter-frequency CSI-RS measurement in accordance with one novel aspect. The CMTC is configured via high layer RRC signaling and comprised of a timing offset, a duration, and a periodicity as illustrated in FIG. 3. In FIG. 3(*a*), the timing offset refers to a timing reference point can be the starting timing of SMTC in that frequency carrier. For intra-frequency, the default SMTC is referenced. In FIG. 3(*b*) the timing offset refers to a timing reference point that is the frame boundary of any known cell on that frequency carrier for inter-frequency measurement. In FIGS. 3(*c*) and 3(*d*), the timing offset refers to a timing reference pint that is the frame boundary of serving cell for intra-frequency and inter-frequency measurement. The CMTC duration shall not be longer than the configured measurement gap minus RF switching time (e.g., 0.5 ms or 0.25 ms) for inter-frequency measurement. The unit of duration can be in subframes or in milliseconds. The periodicity can be the same or shorter than the configuration measurement gap. For inter-frequency measurement, the periodic of CMTC should be at least two times shorter than the periodicity of measurement gap. The CMTC could be the same as SMTC, if timing offset is 0 ms to the starting timing of SMTC and the duration and periodicity are the same as SMTC.

Figure 4:
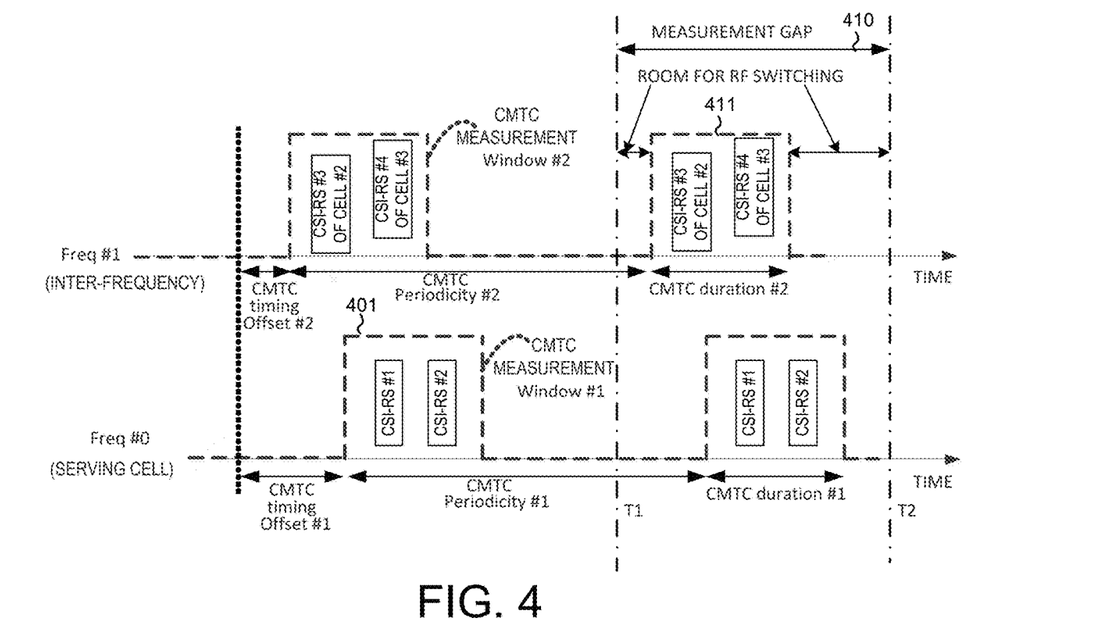
FIG. 4 illustrates a first embodiment of the relationship between CMTC timing window and measurement gap in accordance with one novel aspect.

FIG. 4 illustrates a first embodiment of the relationship between CMTC timing window and measurement gap in accordance with one novel aspect. For frequency band #0 (serving cell), the CMTC configuration #1 comprises a CMTC timing offset #1, a CMTC periodicity #1, and a CMTC duration #1. For frequency band #1 (inter-frequency), the CMTC configuration #2 comprise a CMTC timing offset #2, a CMTC periodicity #2, and a CMTC duration #2. In addition, a measurement gap MG 410 from time T1 to time T2 is also configured for inter-frequency measurement. Without measurement gap configuration, the UE measures CSI-RS during the configured CMTC duration, e.g., CMTC measurement window #1 for serving cell and intra-frequency measurement, and CMTC measurement window #2 for inter-frequency measurement. When a measurement gap MG 410 is configured, if the gap is able to accommodate at least CMTC and RF switching time, then UE performs CMTC measurement within the measurement gap 410, e.g., during CMTC measurement window 411. For intra-frequency measurement, UE performs CMTC measurement outside the gap, e.g., during CMTC measurement window 401.

Figure 5:
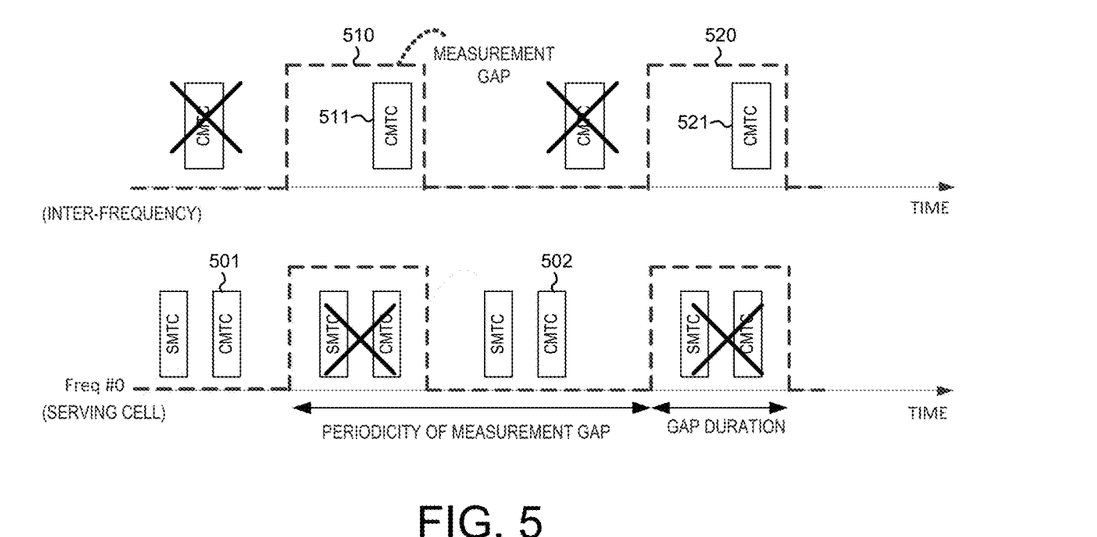
FIG. 5 illustrates a second embodiment of the relationship between CMTC and SMTC timing window and measurement gap in accordance with one novel aspect.

FIG. 5 illustrates a second embodiment of the relationship between CMTC and SMTC timing window and measurement gap in accordance with one novel aspect. For inter-frequency measurement, a measurement gap can be shared by SSB and CSI-RS resources for RRM. If the gap is able to accommodate at least SMTC and CMTC and RF switching time, then UE performs SMTC and CMTC measurement within the measurement gap. Else, SMTC and CMTC are treated as different frequency layers. In the example of FIG. 5, UE performs inter-frequency measurement on CSI-RS resources, within the configured gap and CMTC measurement window, e.g., CMTC 511 within gap 510 and CMTC 521 within gap 520. UE performs intra-frequency measurement on CSI-RS resources, outside the configured gap and within the CMTC measurement window, e.g., CMTC 501 and 502. UE is not required to measure CSI-RS on the resources marked with "cross" signs.

Figure 6:
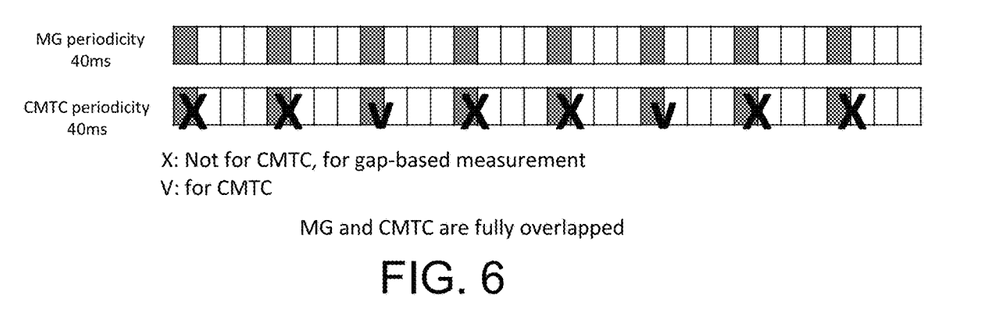
FIG. 6 illustrates a first embodiment of CSI-RS measurement when measurement gap (MG) and CMTC are fully overlapped.

FIG. 6 illustrates a first embodiment of CSI-RS measurement when measurement gap (MG) and CMTC are fully overlapped. For intra-frequency measurement, if CMTC is fully overlapped with the MG, UE performs gap measurement and intra-frequency measurement with respect to the scaling factor $SF_{CMTC\_GAP}$. In the example of FIG. 6, the MG periodicity is 40 ms, the CMTC periodicity is also 40 ms, and the MG and CMTC duration is fully overlapped. If the scaling factor $SF_{CMTC\_GAP}=3$, then one measurement is for CMTC every 3 gap occasions, and the delay requirement for CMTC should be relaxed by $SF_{CMTC\_GAP}=3$. The gap occasion marked by symbol X is for gap-based inter-frequency measurements, and the gap occasion marked by symbol V is for CMTC CSI-RS measurements.

Figure 7:
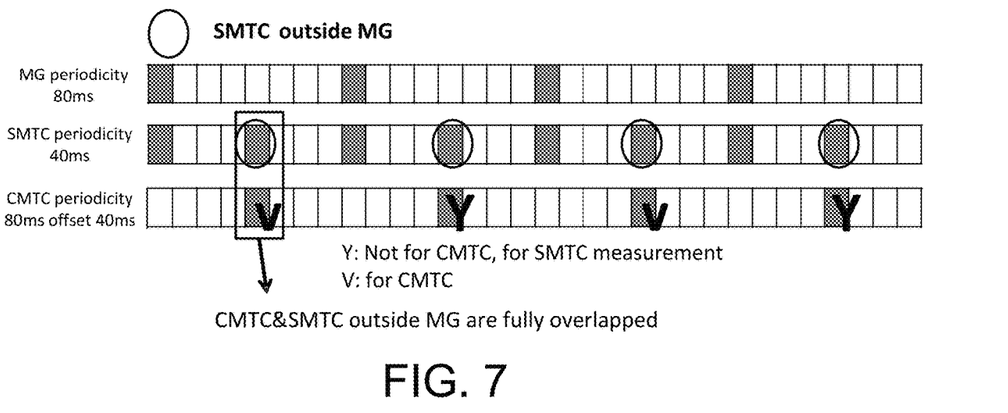
FIG. 7 illustrates a second embodiment of CSI-RS measurement when CMTC and SMTC outside MG are fully overlapped.

FIG. 7 illustrates a second embodiment of CSI-RS measurement when CMTC and SMTC outside MG are fully overlapped. For intra-frequency measurement, if CMTC is not fully overlapped with the MG, but CMTC is fully overlapped with SMTC outside measurement gap, then UE performs SMTC measurement and CMTC measurement with respect to the sharing factor $SF_{CMTC\_SMC}$. In the example of FIG. 7, the MG periodicity is 80 ms, the SMTC periodicity is 40 ms, the CMTC periodicity is 80 ms with 40 ms timing offset, and the SMTC and CMTC outside MG are fully overlapped. SMTC and CMTC apply the sharing factor $SF_{CMTC\_SMTC}$. If the sharing factor equal to two, then one measurement is for CMTC every 2 SMTC outside MG. As a result, UE alternates for CMTC and SMTC measurements outside MG. For each configured CMTC window, the occasion marked by symbol Y is for SSB measurement, and the occasion marked by symbol V is for CSI-RS measurement.

Figure 8:
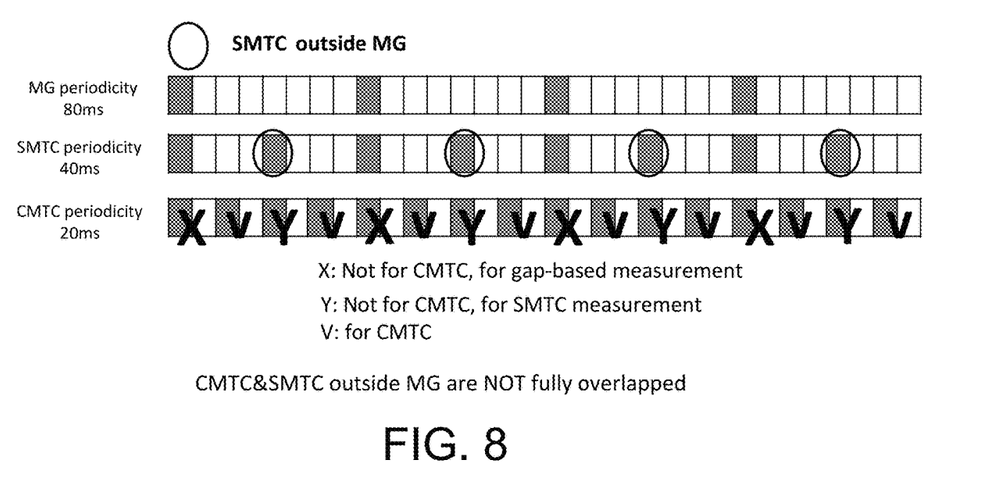
FIG. 8 illustrates a third embodiment of CSI-RS measurement when CMTC and SMTC outside MG are not fully overlapped.

FIG. 8 illustrates a third embodiment of CSI-RS measurement when CMTC and SMTC outside MG are not fully overlapped. For intra frequent measurement, if CMTC is NOT fully overlapped with gap, and CMTC is NOT fully overlapped with SMTC outside measurement gap, then UE performs CMTC measurement outside SMTC. In the example of FIG. 8, the MG periodicity is 80 ms, the SMTC periodicity is 40 ms, the CMTC periodicity is 20 ms, and the SMTC and CMTC outside MG are NOT fully overlapped. As a result, for each configured CMTC window, the occasion marked by symbol X is for gap-based measurement, the occasion marked by symbol Y is for SSB measurement, and the occasion marked by symbol V is for CSI-RS measurement.

Figure 9:
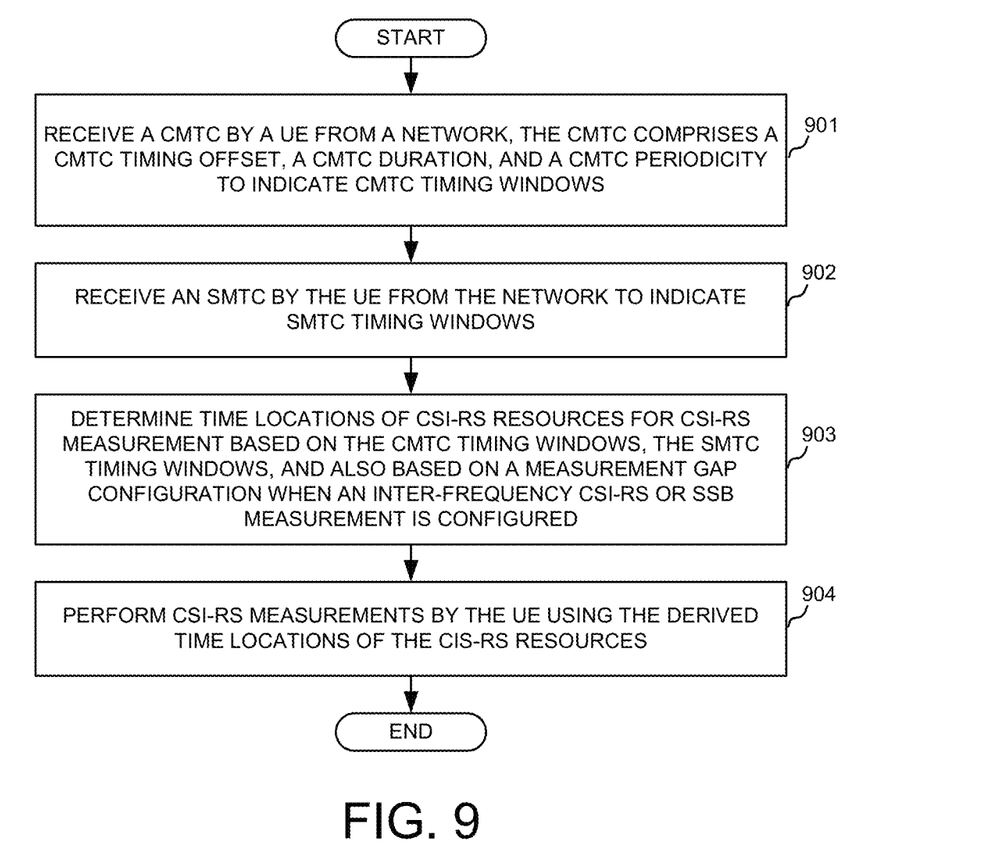
FIG. 9 is a flow chart of a method for CSI-RS measurement and configuration in accordance with embodiments of the current invention.

FIG. 9 is a flow chart of a method for CSI-RS measurement and configuration in accordance with embodiments of the current invention. In step 901, a UE receives a channel state information reference signal (CSI-RS) measurement timing configuration (CMTC) from a network. The CMTC comprises a CMTC timing offset, a CMTC duration, and a CMTC periodicity to indicate CMTC timing windows. In step 902, the UE receives a synchronization signal block (SSB) measurement timing configuration (SMTC) to indicate SMTC timing windows from the network. In step 903, the UE determines time locations of CSI-RS radio resources for CSI-RS measurement based on the CMTC timing windows, the SMTC timing windows, and also based on a measurement gap configuration when an inter-frequency CSI-RS or SSB measurement is configured. In step 904, the UE performs CSI-RS measurements using the derived time locations of the CSI-RS resources.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a channel state information reference signal (CSI-RS) measurement timing configuration (CMTC) by a user equipment (UE) from a network, wherein the CMTC comprises a CMTC timing offset, a CMTC duration, and a CMTC periodicity to indicate CMTC timing windows;
   receiving a synchronization signal block (SSB) measurement timing configuration (SMTC) to indicate SMTC timing windows from the network, wherein the CMTC timing offset is reference to a frame boundary or a starting timing of a default SMTC of a serving cell when the CMTC is configured for an intra-frequency CSI-RS measurement in the serving cell frequency carrier;
   determining time locations of CSI-RS radio resources for CSI-RS measurement based on the CMTC timing windows, the SMTC timing windows, and also based on a measurement gap configuration when an inter-frequency CSI-RS or SSB measurement is configured; and
   performing CSI-RS measurements by the UE using the derived time locations of the CSI-RS resources.

2. The method of claim 1, wherein the UE performs intra-frequency CSI-RS measurement outside the measurement gap and within the CMTC measurement windows.

3. The method of claim 1, wherein the CMTC windows are fully overlapped with the measurement gap, wherein UE performs intra-frequency measurement and inter-frequency measurement with respect to a scaling factor.

4. The method of claim 1, wherein the CMTC windows and the SMTC windows are fully overlapped outside the measurement gap, wherein the UE performs CSI-RS and SSB measurements with respect to a sharing factor.

5. A method comprising:
   receiving a channel state information reference signal (CSI-RS) measurement timing configuration (CMTC) by a user equipment (UE) from a network, wherein the CMTC comprises a CMTC timing offset, a CMTC duration, and a CMTC periodicity to indicate CMTC timing windows;
   receiving a synchronization signal block (SSB) measurement timing configuration (SMTC) to indicate SMTC timing windows from the network;
   determining time locations of CSI-RS radio resources for CSI-RS measurement based on the CMTC timing windows, the SMTC timing windows, and also based on a measurement gap configuration when an inter-frequency CSI-RS or SSB measurement is configured; and
   performing CSI-RS measurements by the UE using the derived time locations of the CSI-RS resources, wherein the CMTC windows are not fully overlapped with the gap and not fully overlapped with the SMTC windows outside the gap, where the UE performs CSI-RS measurement outside the SMTC windows.

6. A User Equipment (UE), comprising:
   a receiver that receives a channel state information reference signal (CSI-RS) measurement timing configuration (CMTC) and receives a synchronization signal block (SSB) measurement timing configuration (SMTC) from a network to indicate CMTC and SMTC timing windows, wherein the CMTC comprises a CMTC timing offset, a CMTC duration, and a CMTC periodicity, wherein the CMTC timing offset is reference to a frame boundary or a starting timing of a default SMTC of a serving cell when the CMTC is configured for an intra-frequency CSI-RS measurement in the serving cell frequency carrier;
   a CSI-RS measurement config module that determines time locations of CSI-RS radio resources for CSI-RS measurement based on the CMTC timing windows, the SMTC timing windows, and also based on a measurement gap configuration when an inter-frequency CSI-RS or SSB measurement is configured; and
   a measurement module that performs CSI-RS measurements using the derived time locations of the CSI-RS resources.

7. The UE of claim 6, wherein the UE performs intra-frequency CSI-RS measurement outside the measurement gap and within the CMTC measurement windows.

8. The UE of claim 6, wherein the CMTC windows are fully overlapped with the measurement gap, wherein UE performs intra-frequency measurement and inter-frequency measurement with respect to a scaling factor.

9. The UE of claim 6, wherein the CMTC windows and the SMTC windows are fully overlapped outside the measurement gap, wherein the UE performs CSI-RS and SSB measurements with respect to a sharing factor.

10. A User Equipment (UE), comprising:
    a receiver that receives a channel state information reference signal (CSI-RS) measurement timing configuration (CMTC) and receives a synchronization signal block (SSB) measurement timing configuration (SMTC) from a network to indicate CMTC and SMTC timing windows, wherein the CMTC comprises a CMTC timing offset, a CMTC duration, and a CMTC periodicity, wherein the CMTC timing offset is reference to a frame boundary or a starting timing of a default SMTC of a serving cell when the CMTC is configured for an intra-frequency CSI-RS measurement in the serving cell frequency carrier;
    a CSI-RS measurement config module that determines time locations of CSI-RS radio resources for CSI-RS measurement based on the CMTC timing windows, the SMTC timing windows, and also based on a measurement gap configuration when an inter-frequency CSI-RS or SSB measurement is configured; and
    a measurement module that performs CSI-RS measurements using the derived time locations of the CSI-RS resources, wherein the CMTC windows are not fully overlapped with the gap and not fully overlapped with the SMTC windows outside the gap, where the UE performs CSI-RS measurement outside the SMTC windows.

* * * * *